(12) United States Patent
Moses

(10) Patent No.: US 12,261,557 B2
(45) Date of Patent: Mar. 25, 2025

(54) ELECTRIC MOTOR

(71) Applicant: Donald Moses, St-Côme (CA)

(72) Inventor: Donald Moses, St-Côme (CA)

( * ) Notice: Subject to any disclaimer, the term of this patent is extended or adjusted under 35 U.S.C. 154(b) by 173 days.

(21) Appl. No.: 18/136,713

(22) Filed: Apr. 19, 2023

(65) Prior Publication Data

US 2024/0356474 A1    Oct. 24, 2024

(51) Int. Cl.
*H02P 25/22* (2006.01)
*H02P 25/18* (2006.01)

(52) U.S. Cl.
CPC ............ H02P 25/22 (2013.01); H02P 25/184 (2013.01); *H02P 2207/05* (2013.01)

(58) Field of Classification Search
CPC ..... H02P 25/22; H02P 25/184; H02P 2207/05
USPC .......................................................... 318/496
See application file for complete search history.

(56) References Cited

U.S. PATENT DOCUMENTS

| | | | | |
|---|---|---|---|---|
| 3,663,878 | A * | 5/1972 | Miyasaka | H02P 6/14 318/400.41 |
| 10,953,751 | B2 * | 3/2021 | Pfeilschifter | B60L 50/40 |
| 11,479,139 | B2 * | 10/2022 | Smolenaers | H02J 7/345 |
| 2004/0263110 | A1 * | 12/2004 | Pendell | H02K 17/42 318/794 |

* cited by examiner

*Primary Examiner* — Jorge L Carrasquillo

(57) ABSTRACT

An electric motor, comprising a plurality of coils each activatable by selectively providing direct current thereto and at least one capacitor, wherein the electric motor is configured to recover energy stored in at least one of the coils into the at least one capacitor when the direct current is switched off.

20 Claims, 4 Drawing Sheets

ELECTRIC MOTOR

FIELD OF THE INVENTION

The present invention relates to the general field of motors, and is more particularly concerned with an electric motor.

BACKGROUND

Powerful electric motors are often powered using alternating current, for example triphasic alternating current. In some applications, such as in electric and hybrid vehicles, this alternating current is provided by an inverter connected to batteries. There is some loss of power in the inverter. In addition, the need for a auxiliary glycol cooling pump is often used to successfully cool the inverter.

Also, in these motors, the polarity of coils powered by the alternating current changes as a function of the position of the motor's rotor. Therefore, during each rotation of the rotor, each coil is powered with a first polarity, which creates a magnetic field having a first orientation, followed by reversal of the polarity, and therefore of the magnetic field. To reverse the orientation of the magnetic field, the magnetic field must first be reduced to zero before being increased with the opposite orientation. The energy stored in the magnetic field must therefore be removed from the coil each time the orientation of the magnetic field is reversed. Part of this energy may be recovered in some motors, but there are many parasitic losses that decrease the efficiency of the motor.

In addition, standard triphasic motor are not always optimized according to the force provided by Lorentz's Law as they provide a force over a relatively large angular displacement. Furthermore, in the standard triphasic motors, there is no dead time between different phases of the system, which causes magnetic hysteresis to cause further energy losses, and continuously cause parasitic heat generation. The types of inefficiencies mentioned above result in a decrease in the range of a vehicle powered by the electric motor when compared to an ideal system.

Thus, there is a need on the market for an improved electric motor. An object of the present invention is therefore to provides such an electric motor.

SUMMARY OF THE INVENTION

In a broad aspect, there is provided an electric motor, comprising: a rotor including a permanent magnet; a stator including coils disposed circumferentially therearound; a pair of power input terminals for receiving direct current (DC) electrical power; a capacitor; and a plurality of switches selectively openable and closable so that each coil is operable between a powered mode and a regeneration mode, wherein, in the powered mode, the coil is electrically coupled to the power input terminals, the capacitor, or both the power input terminals and the capacitor to allow transfer of electric power from at least one of the power input terminals and the capacitor to the coil, and, in the regeneration mode, the coil is electrically coupled to the capacitor to allow transfer of energy stored in the coil to capacitor.

There may also be provided an electric motor wherein the coil is further operable in a passive mode wherein the coil is in an open circuit with both the capacitor and the power input terminals such that there is no transfer of energy into or out of the coil.

There may also be provided an electric motor wherein, in the powered mode, the coil is electrically coupled to both the power input terminals and the capacitor in parallel.

There may also be provided an electric motor further comprising a diode for preventing discharge of the capacitor towards the power input terminals.

There may also be provided an electric motor wherein the pair of power input terminals is a first pair of power input terminals, the capacitor is a first capacitor, the powered mode is a first powered mode, and the regeneration mode is a first regeneration mode, the electric motor further comprising a second pair of power input terminals for receiving DC electrical power; and a second capacitor; the plurality of switches are selectively openable and closable so that each coil is operable between a second powered mode and a second regeneration mode, wherein, in the second powered mode, the coil is electrically coupled to the second power input terminals, the second capacitor, or both the second power input terminals and the second capacitor to allow transfer of energy from at least one of the second power input terminals and the second capacitor to the coil, and, in the second regeneration mode, the coil is electrically coupled to the second capacitor to allow transfer of energy stored in the coil to the second capacitor.

There may also be provided an electric motor wherein the rotor defines a north pole and a south pole; each coil from the plurality of coils is electrically connected in series to another one of the coils from the plurality coils located diametrically opposed thereto on the stator and wound such that forces exerted on the north and south poles by the two coils are similar to each other.

There may also be provided an electric motor wherein the plurality of coils includes delta coils connected to each other in a delta configuration defining three edges and three vertices, and wye coils connected to each other in a wye configuration defining three branches each defining opposed proximal and distal ends, the proximal ends being substantially equipotentially electrically linked to each other, wherein the delta and wye configurations are linked to each other such that one of the vertices of the delta configuration is substantially equipotential with the distal end of one of the branches of the wye configuration.

There may also be provided an electric motor wherein the edges of the delta configuration have substantially similar edge inductances, and the branches of the wye configuration have substantially similar branch inductances.

There may also be provided an electric motor wherein the edge inductances are about twice the branch inductances.

There may also be provided an electric motor wherein the edges of the delta configuration are operated with three electrical delta phases offset by about 120 degrees relative to each other, the branches of the wye configuration are operated with three wye phases offset by about 120 degrees relative to each other, and the delta and wye phases are as a group offset by about 30 degrees relative to each other.

There may also be provided an electric motor wherein the coils within each side of the delta configuration are angularly superposed with the coils of a respective one of the branches of the wye configuration.

There may also be provided an electric motor further comprising a position sensor for sensing a relative position between the rotor and the stator.

There may also be provided an electric motor further comprising a speed sensor for sensing a relative rotation speed between the rotor and the stator.

There may also be provided an electric motor wherein the motor is operable to exert a braking action to recover mechanical energy from a moving mass connected to the motor by slowing down the moving mass and transferring energy to the power terminals.

There may also be provided an electric motor wherein the switches from the plurality of switches are electronic switches, the electric motor further comprising a controller for selectively individually opening and closing the electronic switches.

There may also be provided an electric motor wherein the controller is operative for modulating a duration of energy pulses provided to the coils during the powered phase as a function of an external load applied to the electric motor.

There may also be provided an electric motor wherein each coil is activated according to a repeating sequence of first powered mode, second regeneration mode, passive mode, second powered mode, first regeneration mode, passive mode.

There may also be provided an electric motor wherein each coil is powered with opposite polarities in the first and second powered modes.

There may also be provided an electric motor wherein in the first and second regeneration modes, the first and second capacitors and the coil are all in series with the first and second capacitors having anodes thereof connected to each other.

There may also be provided an electric motor wherein the edges of the delta configuration have substantially similar edge resistance, and the branches of the wye configuration have substantially similar branch resistance, the branch resistance being about one third of the edge resistance.

In another broad aspect, there is provided an electric motor, comprising: a plurality of coils each activatable by selectively providing pulses of direct current thereto; and at least one capacitor; wherein the electric motor is configured to recover energy stored in at least one of the coils into the at least one capacitor when the direct current is switched off.

There may also be provided an electric motor wherein the electric motor is also configured to selectively provide energy from the capacitor to the at least at one of the coils or to another one of the coils.

In another broad aspect, there is provided a method of operating an electric motor having coils, the method comprising: a) powering at least one of the coils using direct current for a duration short enough to avoid saturation of the one of the coils, thereby creating a magnetic field in the at least one of the coils having magnetic energy; b) interrupting the direct current; and c) converting the magnetic energy to electric energy stored in a capacitor. In some embodiments, another capacitor is used as a potentiel pump for helping a fast and complete or almost complete transfert of energy.

There may also be provided a method further comprising using the electric energy to power the at least one of the coils or another one of the coils.

There may also be provided a method wherein the direct current is provided by a battery.

Advantageously, the proposed motor recovers in the capacitor at large portion of the energy stored in the magnetic field of the coils when their polarity is reversed, so that this energy can be used to power the coils in subsequent cycles. Also, the proposed motor does not require an inverter, and the associated inefficiencies. Furthermore, in some embodiments, the proposed motor can produce relatively large torques. This is due to the use of capacitors that can generate relatively high tensions, which result in large currents, and therefore large magnetic fields in the coils. It is to be noted that in some embodiments, these high tensions are produced only for a relatively short time interval for each coil, which can be better tolerated by the various components of the electric motor, as opposed to the same tensions that would be used continuously if a conventional triphasic motor powered with the same tension were used. In addition, in some embodiments, the proposed motor applies motive force to the rotor only over a relatively small angular displacement for each phase, which may optimize the force exerted on the rotor.

An advantage of the proposed electric motor is that in some embodiments, it becomes relatively powerful and efficient at high speed, since the duration of the coil activation pulses is relatively short to respect the saturation criteria of the inductive values of the motor. At high speed, this same inductance charging pulse duration will represent a larger angular corridor during the 24 powered/regeneration sequences that will occur with each revolution of the motor. And moreover at high speed, the frequency of the regenerative sequences will increase.

Other objects, advantages and features of the present invention will become more apparent upon reading of the following non-restrictive description of some embodiments thereof, given by way of example only with reference to the accompanying drawings.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention.

Generally speaking, the proposed motor uses DC current to power coils using brief pulses of current and includes energy storage components, such as capacitors, to recover at least part of the energy stored in the magnetic field of the coils when the later are unpowered during some phases of the motor operation. This recovered energy can then be used to power the coils in subsequent phases of motor operation.

Figure 1:
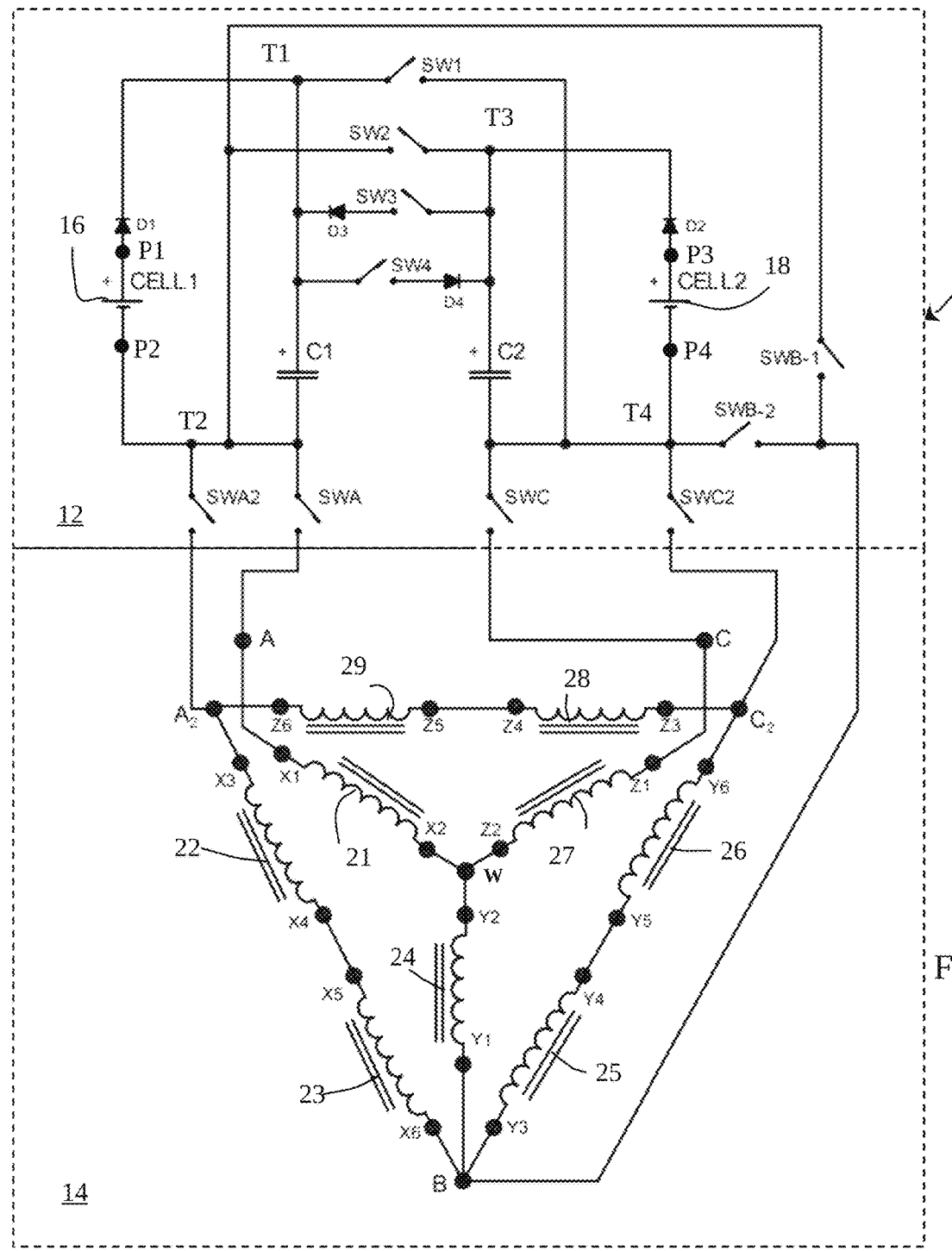
FIG. 1, in a schematic view, illustrates the electric circuit of an electric motor in accordance with an embodiment of the present invention.

FIG. 1 illustrates schematically the electric circuit representing the proposed electric motor 10. The motor 10 includes a power module 12 and a motor module 14. The power module 12 include the various components required to selectively provide current to the motor module 14 and recover at least part of the magnetic energy stored in the motor module 14 when delivery of electrical power thereto is interrupted. The motor module 14 includes components that will be switched on and off during operation of the motor 10 to provide a motive force to a rotor, as further described below. The power module 12 is powered by first and second batteries 16 and 18, although a single battery or more than two batteries could be used in alternative embodiments. If a single battery is used, there may be a need to use an isolation stage to prevent unwanted flow of energy within the motor 10. The first and second batteries 16 and 18 include for example a plurality of lithium-ion cells, or any other types of battery cells usable to provide direct current.

The first battery 16 is connected at the anode to a first power input terminal P1 and at the cathode to a second power input terminal P2. Similarly, the second battery 18 is connected at the anode to a third power input terminal P3 and at the cathode to a fourth power input terminal P4. While the first and second batteries 16 and 18 are shown as part of the power module 12 in FIG. 1, in some embodiments, the first and second batteries are remote from the power module 12 and not part thereof.

The motor module 14 has five input nodes A, $A_2$, B, C and $C_2$. Tension can be provided between selected pairs of the five input nodes A, $A_2$, B, C, and $C_2$ by the power module 12. The motor module 14 also includes nine coil equivalents 21 to 29. A coil equivalent 21 to 29 includes one or more coils provided in series with each other and used to generate a magnetic field in the motor 10 to provide motive force. A coil equivalent 21 to 29 therefore behaves like an inductance with a relatively small resistance in the motor module 14. In a typical embodiment, the coils are part of the stator of a motor 10 and used to rotate a rotor including for example permanent magnets, as further described below. The coil equivalents 21 to 29 all have substantially similar inductance. This is convenient as similar coils can then be used in the physical implementation of the electric motor 10. However, some of the coil equivalents 21 to 29 that are in series to each other could be replaced by a single coil equivalent having a different inductance, as detailed below. Furthermore, In some embodiments, the resistance of the coil equivalents 21, 24 and 27 is smaller by about 33% than that of coil equivalents 22, 23, 25, 25, 28 and 29, for example by using a larger wire in the corresponding coils, so as to be able to achieve similar peak currents in the wye and delta configurations of the motor, and also be able to recover same level of energy on wye and delta configuration while the motor is running. With this adjustment, the resistive value of the line-line impedance of the three phases in wye is identical to the resistive value of the line-line impedance of the three phases in delta Each coil equivalent 21 to 29 extends between two nodes according to the configuration set forth in Table 1.

TABLE 1

Position of the coil equivalents 21 to 29
relative to the nodes X1 to Z6 in FIG. 1

| Coil equivalent | First node | Second node |
|---|---|---|
| 21 | X1 | X2 |
| 22 | X3 | X4 |
| 23 | X5 | X6 |
| 24 | Y1 | Y2 |
| 25 | Y3 | Y4 |
| 26 | Y5 | Y6 |
| 27 | Z1 | Z2 |
| 28 | Z3 | Z4 |
| 29 | Z5 | Z5 |

Coil equivalents 21, 24 and 27 are provided in a wye configuration. To that effect, nodes X2, Y2 and Z2 are all electrically connected to a central node W. Electrically connected nodes have substantially identical electrical potentials, with extremely minor potential drops due to the resistance of the wires interconnecting the nodes. Also, Nodes X1, Y1 and Z1 are electrically connected respectively to nodes A, B and C. Therefore, coil equivalents 21, 24 and 27 form branches of the wye configuration.

Coil equivalents 22, 23, 25, 26, 28 and 29 are provided in a delta configuration. More specifically, the delta configuration includes 3 edges including respectively coil equivalents 22 and 23, coil equivalents 25 and 26, and coil equivalents 28 and 29. Nodes $A_2$, B and $C_2$ form the vertices of the delta configuration. To that effect, Nodes Z4 and Z5, Y4 and Y5, and X4 and X5 are pairwise electrically connected to each other, while the pairs of nodes Z6 and X3, Z3 and Y6, and X6 and Y3 are respectively electrically connected to nodes $A_2$, $C_2$ and B. Therefore, a distal end of one of the branches of the wye configuration shares node B with one of the vertices of the delta configuration.

The power module 12 includes four terminals T1, T2, T3 and T4, two capacitors C1 and $C_2$, four diodes D1, D2, D3 and D4, and ten switches SW1, SW2, SW3, SW4, SWA, SWA2, SWB-1, SWB-2, SWC and SWC2. The reader skilled in the art will understand the exact number and configuration of these components may vary according to the exact embodiment of the invention without departing from the scope of the claims. The switches SW1, SW2, SW3, SW4, SWA, SWA2, SWB-1, SWB-2, SWC and SWC2 are typically high speed electronic power switches allowing to rapidly switch between open and closed states and to carry in the closed state relatively large currents. The capacitors C1 and C2 could be individual physical capacitors, or banks of such physical capacitors, or supercapacitors. The capacitors C1 and C2 can be charged and discharged relatively rapidly under relatively large tensions to receive and release electric energy in the form of charges stored on metal components separated from each other by a dielectric material. This is to be contrasted to batteries, which use electrochemical reactions to store energy. The diodes D1 to D4 are used to only allow unidirectional flow of current between some components, as described below.

Terminals T1 and T2 are electrically connected respectively to power input terminals P1 and P2, with diode D1 between the first power terminal P1 and the terminal T1 to prevent current to flow back to the first battery 16 from the first terminal T1. Similarly, terminals T3 and T4 are electrically connected respectively to power input terminals P3 and P4, with diode D2 between the first power input terminal P3 and the terminal T3 to prevent current to flow back to the second battery 18 from the power terminal T3.

The capacitors C1 and C2 are respectively connected to power terminals T1 and T3 at their anode and to power terminals T2 an T4 at their cathode. Therefore, the capacitors C1 and C2 are in parallel respectively with the first and second batteries 16 and 18. One function of the diodes D1 and D2 is therefore to prevent discharge of the capacitors C1 and C2 into the first and second batteries 16 and 18 when they are under a tension larger than the tension of the first and second batteries 16 and 18.

Switches SW1, SW2, SW3 and SW4 control the flow of current within the power module 12, while switches SWA, SWA2, SWB-1, SWB-2, SWC and SWC2 control the flow of current between the power module 12 and respectively nodes A, $A_2$, B, B, C and $C_2$. One can note that two switches, SWB-1 and SWB-2 control connection of the power module 12 to the node B. The other switches SWA, SWA2, SWC and SWC2 each control connection between the power module 12 and a single one of the nodes A, $A_2$, C and $C_2$. Switches SWA, SWA2 and SWB-1 extend between the terminal T2 and respectively nodes A, $A_2$ and B. Switches SWC, SWC2 and SWB-2 extend between the terminal T4 and respectively nodes C, $C_2$ and B. Switch SW1 extends between terminals T1 and T4, switch SW2 extends between terminals T2 and T3, and switches SW3 and SW4 both extend between terminals T1 and T3. Diodes D3 and D4 are in series with respectively switches SW3 and SW4 to prevent flow of current respectively from terminal T1 to terminal T3 and vice-versa through the switches SW3 and SW4.

Figure 2:
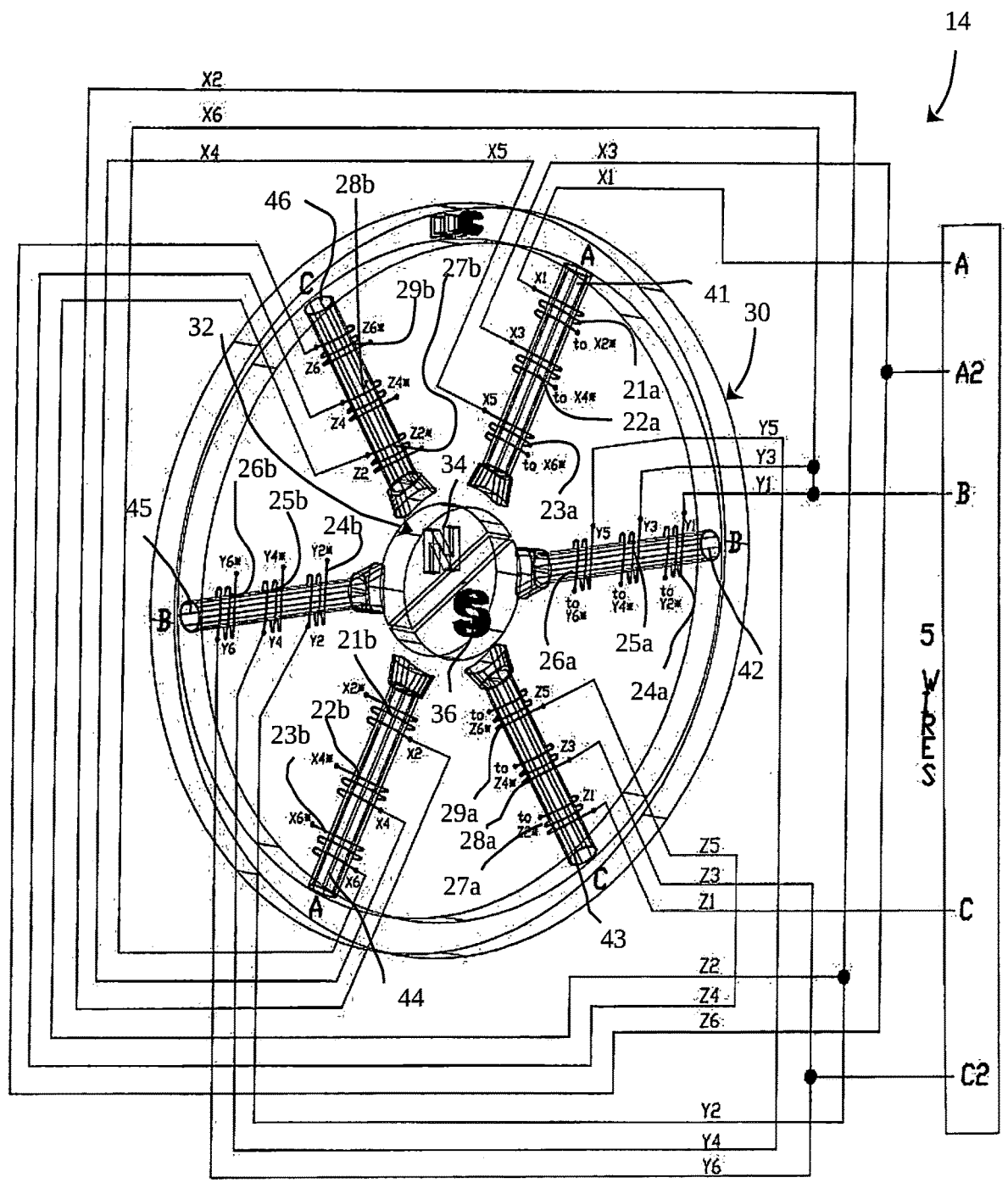
FIG. 2, in a schematic view, illustrates the wiring of one configuration example of the electric motor of FIG. 1.

FIG. 2 illustrates the physical configuration of the power module 14. The power module 14 includes a stator 30 and a rotor 32. The rotor 32 is mounted so as to be rotatable about the stator 30, and typically includes an output shaft (not shown in the drawings) to provide rotational power from rotation of the rotor 32. The rotor 32 shown in the drawings is bipolar and includes one or more permanent magnets defining opposed north and south poles 34 and 36. However, in alternative embodiments, the rotor 32 includes more than two poles. Also, the rotor 32 may include electromagnets or superconducting electromagnets.

The stator 30 includes 6 poles 41 to 46 forming 3 pole pairs. Poles 41 and 44 are paired, poles 42 and 45 are paired, and poles 43 and 46 are paired. The poles 41 and 46 within each pair are diametrically opposed to each other on the stator 30 and produce magnetic fields of opposite polarities, as the rotor 32 is bipolar. Each pole pair corresponds to three coil equivalents 21 to 29. Each coil equivalent 21 to 29 includes respectively two coils 21a and 21b to 29a and 29b, located on opposite poles. Coil equivalents 21, 22 and 23 are wound on pole 41 and 44, coil equivalents 24, 25 and 26 are wound on poles 42 and 45, and coil equivalent 27, 28 and 29 are wound on poles 43 and 46. While the coils 21a to 29b shown in FIG. 2 are shown spaced apart from each other, the coils 21a to 29b are typically intertwined or wound adjacent or on top of each other, such that the coils 21a to 29b provided at each pole 41 to 46 provides a similar magnetic attraction to the rotor 32.

A specific example of correspondence between FIGS. 1 and 2 is now given, with the understanding that similar relationships exist for the other coils 21a to 29b and coil equivalents 21 to 29. Coil equivalent 21 includes coils 21a and 21b. Coils 21a starts at node X1 and ends at node "to X2*", which is connected to node X2* through a wire, not shown in FIG. 2 for clarity reason. Coil 21b starts at node X2* and finishes at node X2. Coils 21a and 21b are therefore in series, and are wound so that when a current of given polarity circulates within coils 21a and 21b, the magnetic fields produced within coils 21a and 21b will have an opposed radial orientation when viewed relative to the rotor 32. In other words, while the magnetic dipoles creates by coils 21a and 21b are aligned in the same direction in space, they exert similar forces on the rotor 32 as the coils 21a and 21b are on opposite sides of the stator 30.

It should be noted that while coil equivalents 21, 22 and 23 are on the same physical pair of poles 41 and 44 in the stator 30, they will not all be in phase during operation of the electric motor 10. Indeed, the three sides of the delta configuration are operated typically 120 degrees out of phase relative to each other. Also, the three branches of the wye configuration are operated also 120 degrees out of phase relative to each other. However, the wye and delta configurations are not in phase, but instead 30 degrees out of phase relative to each other. This phase shift is the reason for the fact that the inductance of each side of the delta configuration is double the inductance of each branch of the wye configuration. The motor 10 is can therefore be considered a 6 phase motor, even if only three pole 41 to 46 pairs are provided in the stator 30.

Figure 4:
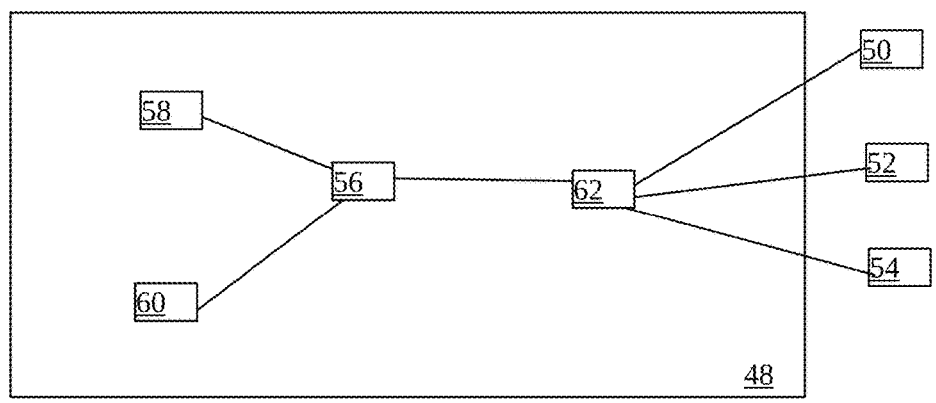
FIG. 4, in a schematic view, illustrates a controller usable to control the electric motor of FIG. 1, along with components connected thereto.

Referring to FIG. 4, the electric motor 10 is controlled by a controller 48. The controller 48 is operatively connected to switches SW1, SW2, SW3, SW4, SWA, SWA2, SWB-1, SWB-2, SWC and SWC2, represented collectively by the reference numeral 50 in FIG. 4, to selectively open and close selected ones of the switches SW1, SW2, SW3, SW4, SWA, SWA2, SWB-1, SWB-2, SWC and SWC2 at different stages of operation of the motor 10. The controller 48 is for example a microcontroller. The electric motor 10 is also typically provided with a position sensor 52 for sensing a position of the rotor 32 relative to the stator 30 and feeding this information to the controller 48 to time the powering and shutting down the coils 21a to 29b. In some embodiments, the position sensor 52 is also used to sense a rotation speed of the rotor 32 relative to the stator 30. However, in alternative embodiments, the rotation speed is detected using a dedicated speed sensor 54.

The controller 48 includes a processor 56 and memory 58 (e.g., random-access memory, read-only memory, flash memory). The controller 48 may also include in some embodiments an electronic storage unit 60 (e.g., hard disk or solid state drive, among others) and communication interface 62 (e.g., network adapter) for communicating with one or more other systems. The communication interface 62 is also operable to obtain data from the position and speed sensors 52 and 54 and to close and open the switches 50. In some embodiments, the controller 48 also includes peripheral devices, such as cache, other memory, data storage and/or electronic display adapters, among others.

The memory 58, storage unit 60, interface 62 and peripheral devices, when present, are in communication with the processor 56 through a communication bus (solid lines). The storage unit 60 can be a data storage unit (or data repository) for storing data and/or programs. The controller 48 can in some embodiments be operatively coupled to a computer network ("network") (not shown in the drawings) with the aid of the communication interface 62. The network can be the Internet, an internet and/or extranet, or an intranet and/or extranet that is in communication with the Internet. In some embodiments, the network is part of a network interconnecting components in a vehicle, such as an automobile network, for example selected from a Controller Area Network (CAN), Automotive Ethernet (AE) or FlexRay.

The processor 56 can execute a sequence of machine-readable instructions, which can be embodied in a program or software. The instructions may be stored in a memory location, such as the memory 58. The instructions can be directed to the processor 56, which can subsequently program or otherwise configure the processor 56 to implement methods of operating the electric motor 10 the present disclosure. Examples of operations performed by the processor 56 can include fetch, decode, execute, and writeback. The processor 56 can be part of a circuit, such as an integrated circuit.

Control of the motor 10 is effected through executable code stored on an electronic storage location of the controller 48, such as, for example, in the memory 58 or electronic storage unit 60. The machine executable or machine readable code can be provided in the form of software. During use, the code can be executed by the processor 56. In some cases, the code can be retrieved from the storage unit 60 and stored on the memory 58 for ready access by the processor 56. In some situations, the electronic storage unit 60 can be precluded, and machine-executable instructions are stored in memory 58.

The code can be pre-compiled, or can be compiled during runtime. The code can be supplied in a programming language that can be selected to enable the code to execute in a pre-compiled or as-compiled fashion. The code may provide a user interface allowing commands to be entered, and a control module controlling the dedicated interface, for example in the form of a device driver.

Figure 3:
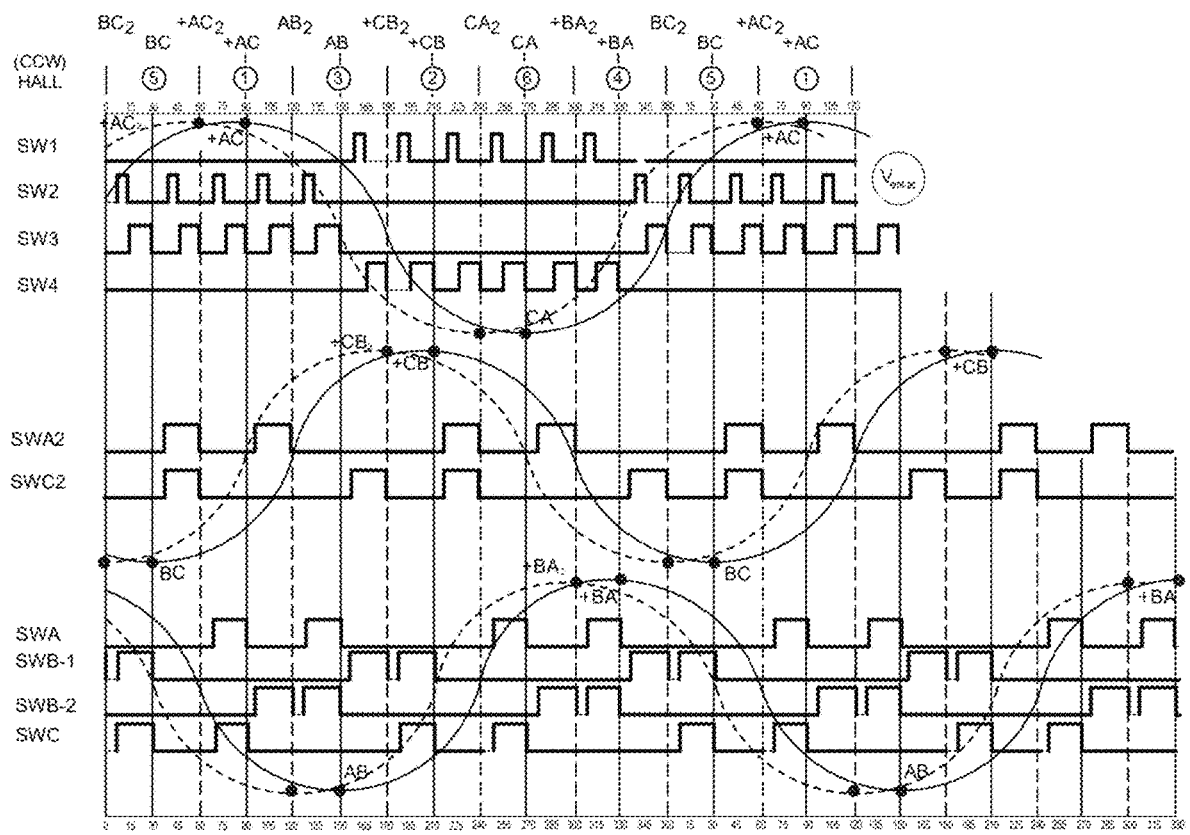
FIG. 3, in a schematic view, illustrates a timing diagram in a method of operation of the electric motor of FIG. 1.

Operation of the motor 10 is now described with respect to FIG. 3. The state of the motor 10 changes 3 times within a range of 30 degrees of rotation of the rotor 32, between the three phases of the motor 10 (powered, regeneration, and passive). Each coil equivalent 21 to 29 goes successively through a powered phases, in which a voltage is applied thereacross, followed immediately by a regeneration phases, in which at least part of the energy stored in the magnetic field of the coil equivalents 21 to 29 during the powered phase is recovered into one of the capacitors C1 or C2, and then a passive phase, in which the coil equivalent 21 to 29 is disconnected from the terminals T1 to T4 so the coil equivalent 21 to 29 is an open circuit with the terminals T1 to T4. This cycle of phases is then repeated, but with an inverse polarity. In the powered phase, the application of a voltage across the coil equivalent 21 to 29 is performed using one of the first and second batteries 16 and 18, using one of the capacitors C1 and C2, or using a combination of the first and second batteries 16 and 18 and one of the capacitors C1 and C2. The powered, regeneration and passive phases correspond respectively to powered, regeneration and passive modes of operation of the coils 21a to 29b.

In the embodiment described in the present document, in the powered phase, the capacitor C1 or C2 connected to the power module 14 is in parallel with a corresponding one of the first and second batteries 16 and 18, as the diodes D1 and D2 then only allow current to flow out of the first and second batteries, with negligible resistance, corresponding to a parallel powering of the coils 21a to 29b. Also, the capacitors C1 and C2 connected to coils 21a to 29b in immediate successive powered and generation phases alternate, and polarity is reversed at the next pair of powered and regeneration phase.

During the powered phase, the voltage applied to the coils 21a to 29b is a pulse of DC voltage, which may vary in time according to an exponential decay when the capacitors C1 and C2 are discharged in the coil equivalents 21 to 29. This application of voltage will create an increasing magnetic field in the coils 21a to 29b. During this powered phase, power is not necessarily delivered for the whole duration of the 15 degrees of rotation of the rotor 32. Longer application of voltage result in larger magnetic fields, and therefore larger torques at the rotor 32. Therefore, changing the fraction of this phase during which voltage is actually applied can be used to regulate the torque exerted by the motor 10.

During the regeneration phase, the first and second batteries 16 and 18 and the capacitors C1 and C2 don't provide power to the coils 21a to 29b. Instead, the polarity of the connection between the coils 21a and 29b and the power terminals T1 and T2 is reversed, when compared to the previous regeneration phase, and the energy stored in the magnetic field of the coils 21a to 29b is fed to one of capacitors C1 or C2. The other capacitor C1 or C2, which remains in parallel with respectively the first and second batteries 16 and 18, is used as a potential pump, with the two capacitors having their anodes connected to each other, which assists in transferring the energy stored in the coil's magnetic field to the capacitor C1 or C2.

FIG. 3 is a timing diagram illustrating the state of each switch SW1, SW2, SW3, SW4, SWA, SWA2, SWB-1, SWB-2, SWC and SWC2 during operation of the motor 10. This timing diagram is periodic with each rotation of the motor. A high state denotes a closed switch SW1, SW2, SW3, SW4, SWA, SWA2, SWB-1, SWB-2, SWC and SWC2, allowing electrical connection thereacross. A low state denotes an open switch SW1, SW2, SW3, SW4, SWA, SWA2, SWB-1, SWB-2, SWC and SWC2 in which no current flows through the switch SW1, SW2, SW3, SW4, SWA, SWA2, SWB-1, SWB-2, SWC and SWC2. The undulating sinusoidal continuous and dashed lines illustrate the 3 phases of the delta configuration (dashed line) and of the wye configuration (continuous line). The phase to which a 30 degrees block related is denoted at the top of the diagram for each 30 degrees block, and the horizontal axis corresponds to the angular position of the rotor with respect to an origin. Typically, the rotor 32 lags slightly to position of a coil 21a to 29a when the latter reaches its peak phase voltage. This offset improves motor efficiency, and is calculated by the controller 100. Theoretical calculations or empirical results may be used to get the correct offset, which, in some embodiments, may vary according to the load applied to the motor 10 and rotation speed of the rotor 32. The wye and delta configurations are powered in alternance.

Switches SW1 and SW2 are used in the powered phases, and the duration of their high state can therefore be varied. Switches SW3 and SW4 are used in the regeneration phase, and they are typically in their high state for almost the whole duration of the regeneration mode, but these switches SW3 and SW4 can be easily adjusted to remain closed by the controller for a lower duration depending how many times full recovery process is needed, as the diodes D1 to D4 prevent oscillation of the LC circuit that is created during this phase. In the regeneration phase, diodes D3 and D4 is used to stop energy transfert when the magnetic circuit coils 21a to 29b are empty. and also prevents the charge of C1 from balancing in C2 and vice versa. At all times, diodes D1 and D2 especially prevent capacitors C1 and C2 from draining into their respective batteries. A small delay is usually introduced between the change in state of the switches SW1, SW2, SW3, SW4, SWA, SWA2, SWB-1, SWB-2, SWC and SWC2 to allow for the switches SW1, SW2, SW3, SW4, SWA, SWA2, SWB-1, SWB-2, SWC and SWC2 to completely switch off when required, so that no short circuit is created. Table 2 includes the sequence of operation of the switches SW1, SW2, SW3, SW4, SWA, SWA2, SWB-1, SWB-2, SWC and SWC2 in a different form.

An example of one powered/regeneration cycle is now described, with the understanding that the other corresponding cycles are similar and follow the sequence of FIG. 3 and Table 2. In this example, the powered phase and regeneration phase of coil equivalents 21 and 27 is described. In the powered phase, switches SW2, SWA and SWC are closed simultaneously. This creates a circuit in which a tension is applied between nodes A and C from power terminals T3 and T4, which creates an increasing current in coil equivalents 21 and 27. The increasing current will create a magnetic field in coils 21a, 21b, 27a and 27b, which can attract the rotor 32 to provide a torque thereonto if this phase is suitably timed. This timing will depend on the configuration of the magnetic fields of the stator 30 and rotor 32 and can be determined using experimental data or simulations. As mentioned, this powered phase will last for at most 15 degrees of rotation of the rotor 32, but can be shorter. The duration of the powered phase can be adjusted for as a function of motor 10 rotation speed and load.

Once the powered phase has been completed, typically when current peak is reached, the regeneration phase begins. To that effect, switch SW2 is open and switch SW3 is closed, typically simultaneously. This disconnects coil equivalents 21 and 27 from terminal T3 and T4, and connects them instead to power terminal T2 and T4. This also reverses the polarity of the coil equivalents 21 and 27, and the current circulating in the coil equivalents 21 and 27 start to increase rapidly to reach a second current peak higher than the first one, followed by a current decrease. This regenerative pulse current creates a tension that will charge capacitor C1. Therefore, the energy that was stored in the magnetic field of the coils 21*a*, 21*b*, 27*a* and 27*b* is transferred to an electric field in the capacitor C1. It is worth noting that the potential of C2 serves to raise the voltage potential towards the terminal T1 in order to obtain a faster and more complete charge towards C1. In this manner, we can ensure in some embodiments complete transfer of the energy stored previously in the magnetic circuit of coil equivalents 21 and 27. Since resistances in the components of the electric motor 10 can be relatively small, this transfer has a very large efficiency, approaching 100%. If timing of this phase is suitably chosen, a torque is sill exerted by coils 21*a*, 21*b*, 27*a* and 27*b* on the rotor 32 during this phase. Once the regeneration phase is completed, switches SW3, SWA and SWC are open so that the passive phase is now reached, and the powered and regeneration phases start for another coil pair. The tension achieved across the capacitor C1 can reach values much higher than the value of the tension provided by the first battery 16, which is possible because of the diode D1.

Figure 5A:
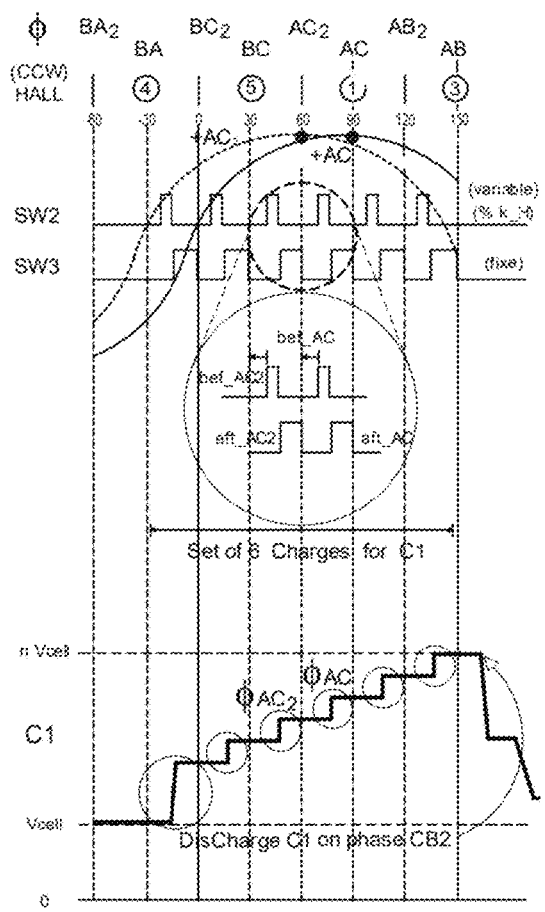
FIG. 5A, in a schematic view, illustrates charge and discharge of capacitor C1 of FIG. 1 as a function of some phases of the timing diagram of FIG. 3.
Figure 5B:
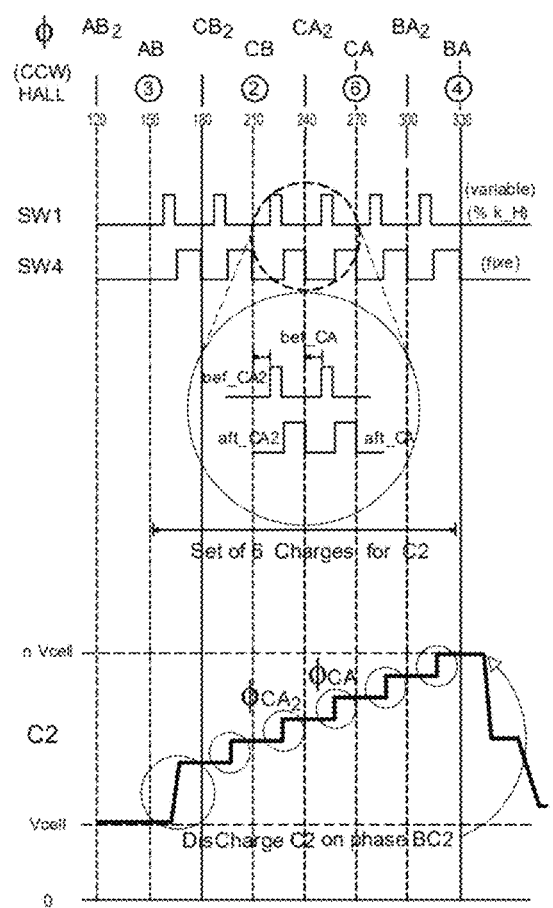
FIG. 5B, in a schematic view, illustrates charge and discharge of capacitor C2 of FIG. 1 as a function of some phases of the timing diagram of FIG. 3.

Due to the specific manner in which the capacitors C1 and C2 are connected to the coil equivalents 21 to 29, each capacitor C1 and C2 will undergo 6 charging cycle before being discharged, as seen in FIGS. 5A and 5B. When this occurs, a very large tension is created, which creates a much larger torque in the electric motor during this phase than in other powered phases. Also, during each rotation of the electric motor 10, each of the phases of the motor will undergo two powered phases, with opposite polarities, each followed by a corresponding regeneration phase.

The proposed motor 10 can also recover energy when a vehicle stops or goes downhill by modulating the switches SW3 or SW4 in accordance with the position of the rotor 32, so that the latter can induce a magnetic field in the coils 21*a* to 29*b*. In this latter mode, switches SW1 and SW2 are closed, and the other switches are modulated to recover energy generated in the coils 21*a* to 29*b* by the rotor 32. In some embodiments, the energy of the magnetic fields is recovered in the capacitors C1 or C$_2$. In this mode, switches SW1 and SW2 are continuously open. In some embodiments, for more energy storage, the circuit of FIG. 1 can be modified by adding additional switches in parallel with diodes D1 and D2, which can then allow the energy generated by the stator in the coils to be fed back to the first and second batteries 16 and 18.

The proposed architecture can be used in any application in which coils are alternatively powered and unpowered, For example, three triphasic transformers can be connected to form the circuit of FIG. 1, and these transformers can then be used to provide triphasic current from the power module 12. The nine coil equivalents 21 to 29 can also be part of three different standard triphasic motors synchronized to each other, synchronized mechanically in series or in parallel. Indeed, the circuit of FIG. 1 is agnostic regarding the exact device that is connected to the power module 12, as long as this device includes inductances configured as in the motor module 14. It should be noted that starting from a standstill requires a different sequence of operation, similarly to other types of electric motors. The motor 10 will typically need to spin a few turns for the controller before the controller can use the sequence of actions illustrated in FIG. 3.

TABLE 2

Sequence of operation of the motor 10 showing the various phases of operation, each lasting over 15 degrees of rotation of the stator.

| PHASE | SW1 | SW2 | SW3 | SW4 | SWA | SWA2 | SWB-1 | SWB-2 | SWC | SWC2 |
|---|---|---|---|---|---|---|---|---|---|---|
| P1-BC | O | C | O | O | O | O | C | O | C | O |
| R1-BC | O | O | C | O | O | O | C | O | C | O |
| P2-AC2 | O | C | O | O | O | C | O | O | O | C |
| R2-AC2 | O | O | C | O | O | C | O | O | O | C |
| P3-AC | O | C | O | O | C | O | O | O | C | O |
| R3-AC | O | O | C | O | C | O | O | O | C | O |
| P4-AB2 | O | C | O | O | O | C | O | C | O | O |
| R4-AB2 | O | O | C | O | O | C | O | C | O | O |
| P5-AB | O | C | O | O | C | O | O | C | O | O |
| R5-AB | O | O | C | O | C | O | O | C | O | O |
| P6-CB2 | C | O | O | O | O | O | C | O | O | C |
| R6-CB2 | O | O | O | C | O | O | C | O | O | C |
| P7-CB | C | O | O | O | O | O | C | O | C | O |
| R7-CB | O | O | O | C | O | O | C | O | C | O |
| P8-CA2 | C | O | O | O | O | C | O | O | O | C |
| R8-CA2 | O | O | O | C | O | C | O | O | O | C |
| P9-CA | C | O | O | O | C | O | O | O | C | O |
| R9-CA | O | O | O | C | C | O | O | O | C | O |
| P10-BA2 | C | O | O | O | O | C | O | C | O | O |
| R10-BA2 | O | O | O | C | O | C | O | C | O | O |
| P11-BA | C | O | O | O | C | O | O | C | O | O |
| R11-BA | O | O | O | C | C | O | O | C | O | O |
| P12-BC2 | O | C | O | O | C | O | C | O | O | C |
| R12-BC2 | O | O | C | O | O | O | C | O | O | C |

P: Powered mode.
R: Regeneration mode.
O: Open switch.
C: Closed switch

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. An electric motor, comprising:
a rotor including a permanent magnet;
a stator including coils disposed circumferentially therearound;
first and second pairs of power input terminals for receiving direct current (DC) electrical power;
a first capacitor and a second capacitor; and
a plurality of switches selectively openable and closable so that each coil is operable between a first powered mode and a first regeneration mode, wherein, in the first powered mode, the coil is electrically coupled to the first pair of power input terminals, the first capacitor, or both the first pair of power input terminals and the first capacitor to allow transfer of electric power from at least one of the first pair of power input terminals and the first capacitor to the coil, and, in the first regeneration mode, the coil is electrically coupled to the first capacitor to allow transfer of energy stored in the coil to the first capacitor;
the plurality of switches being further selectively openable and closable so that each coil is operable between a second powered mode and a second regeneration mode, wherein, in the second powered mode, the coil is electrically coupled to the second pair of power input terminals, the second capacitor, or both the second pair of power input terminals and the second capacitor to allow transfer of energy from at least one of the second power input terminals and the second capacitor to the coil, and, in the second regeneration mode, the coil is electrically coupled to the second capacitor to allow transfer of energy stored in the coil to the second capacitor;
wherein the stator includes delta coils connected to each other in a delta configuration defining three edges and three vertices, and wye coils connected to each other in a wye configuration defining three branches each defining opposed proximal and distal ends, the proximal ends being substantially equipotentially electrically linked to each other.

2. The electric motor as defined in claim 1, wherein the coil is further operable in a passive mode wherein the coil is in an open circuit with both the capacitor and the power input terminals such that there is no transfer of energy into or out of the coil.

3. The electric motor as defined in claim 1, wherein, in the powered mode, the coil is electrically coupled to both the power input terminals and the capacitor in parallel.

4. The electric motor as defined in claim 3, further comprising a diode for preventing discharge of the capacitor towards the power input terminals.

5. The electric motor as defined in claim 1, wherein in the first and second regeneration modes, the first and second capacitors and the coil are all in series with the first and second capacitors having anodes thereof connected to each other through a diode.

6. The electric motor as defined in claim 5, wherein in the first and second regeneration modes, transfer of energy from the coil to one of the first and second capacitors is facilitated by the other one of the first and second capacitors due to the voltage of the first and second capacitors being in series with the coil with inverted polarities.

7. The electric motor as defined in claim 1, wherein
the rotor defines a north pole and a south pole;
each coil from the plurality of coils is electrically connected in series to another one of the coils from the plurality coils located diametrically opposed thereto on the stator and wound such that forces exerted on the north and south poles by the two coils are similar to each other.

8. The electric motor as defined in claim 1, wherein the edges of the delta configuration have substantially similar edge inductances, and the branches of the wye configuration have substantially similar branch inductances.

9. The electric motor as defined in claim 8, wherein the edge inductances are about twice the branch inductances.

10. The electric motor as defined in claim 1, wherein the edges of the delta configuration have substantially similar edge resistance, and the branches of the wye configuration have substantially similar branch resistance, the branch resistance being about one third of the edge resistance.

11. The electric motor as defined in claim 1, wherein the edges of the delta configuration are operated with three electrical delta phases offset by about 120 degrees relative to each other, the branches of the wye configuration are operated with three wye phases offset by about 120 degrees relative to each other, and the delta and wye phases are as a group offset by about 30 degrees relative to each other, so that during each full rotation of the electric motor, the electric motor undergoes twelve pairs of power/regeneration cycles.

12. The electric motor as defined in claim 11, wherein the coils within each side of the delta configuration are angularly superposed with the coils of a respective one of the branches of the wye configuration.

13. The electric motor as defined in claim 1, further comprising a position sensor for sensing a relative position between the rotor and the stator.

14. The electric motor as defined in claim 1, further comprising a speed sensor for sensing a relative rotation speed between the rotor and the stator.

15. The electric motor as defined in claim 1, wherein the motor is operable to exert a braking action to recover mechanical energy from a moving mass connected to the motor by slowing down the moving mass and transferring energy to the power terminals.

16. The electric motor as defined in claim 1, wherein the switches from the plurality of switches are electronic switches, the electric motor further comprising a controller for selectively individually opening and closing the electronic switches.

17. The electric motor as defined in claim 1, wherein the controller is operative for modulating a duration of energy pulses provided to the coils during the powered phase as a function of an external load applied to the electric motor.

18. The electric motor as defined in claim 1, wherein each coil is activated according to a repeating sequence of first powered mode, second regeneration mode, passive mode, second powered mode, first regeneration mode, passive mode.

19. The electric motor as defined in claim 18, wherein each coil is powered with opposite polarities in the first and second powered modes.

20. The electric motor as defined in claim 1, wherein the delta and wye configurations are linked to each other such that one of the vertices of the delta configuration is substantially equipotential with the distal end of one of the branches of the wye configuration.

\* \* \* \* \*